(12) United States Patent
Kay

(10) Patent No.: US 6,344,245 B1
(45) Date of Patent: Feb. 5, 2002

(54) SECURITY DEVICE MANUFACTURE

(75) Inventor: Ralph Kay, Hampshire (GB)

(73) Assignee: De La Rue International Limited, Hampshire (GB)

( * ) Notice: Subject to any disclaimer, the term of this patent is extended or adjusted under 35 U.S.C. 154(b) by 0 days.

(21) Appl. No.: 09/601,085

(22) PCT Filed: Jan. 13, 1999

(86) PCT No.: PCT/GB99/00111

§ 371 Date: Sep. 12, 2000

§ 102(e) Date: Sep. 12, 2000

(87) PCT Pub. No.: WO99/38704

PCT Pub. Date: Aug. 5, 1999

(30) Foreign Application Priority Data

Jan. 29, 1998 (GB) ............................................. 9801947

(51) Int. Cl.⁷ .................................................. C09J 7/04
(52) U.S. Cl. ...................... 427/511; 427/164; 427/171; 427/258; 427/385.5; 427/386; 427/393.5; 427/412.1; 427/510; 427/520; 427/521; 427/558; 427/559; 428/34.9; 428/36.8; 428/36.91; 428/409; 428/411.1; 428/413; 428/542.2

(58) Field of Search .................................. 427/511, 164, 427/171, 385.5, 386, 393.5, 412.1, 510, 520, 521, 558, 559, 258; 428/34.9, 36.8, 36.91, 409, 411.1, 413, 542.2

(56) References Cited

U.S. PATENT DOCUMENTS

| | | |
|---|---|---|
| 4,840,757 A | 6/1989 | Blenkhorn |
| 4,933,120 A | 6/1990 | D'Amato et al. |
| 5,085,514 A | 2/1992 | Mallik et al. |

FOREIGN PATENT DOCUMENTS

| | | |
|---|---|---|
| DE | 41 32 476 A1 | 9/1991 |
| EP | 407 615 A1 | 1/1991 |
| EP | 540 455 A1 | 5/1993 |

Primary Examiner—Bernard Pianalto
(74) Attorney, Agent, or Firm—Oliff & Berridge, PLC

(57) ABSTRACT

A method of manufacturing a security device, the method comprising providing a radiation curable material on a shrinkable substrate; imparting an optically variable effect structure on or into the radiation curable material; and curing the material so that it retains the optically variable effect structure.

14 Claims, 1 Drawing Sheet

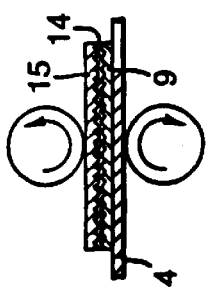 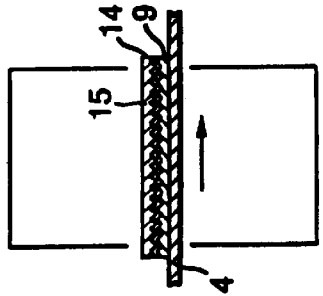 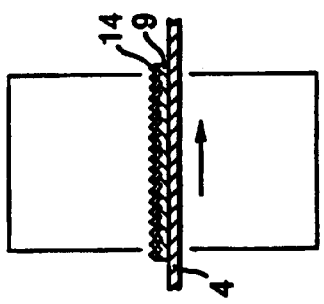 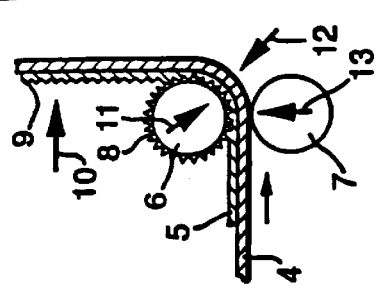 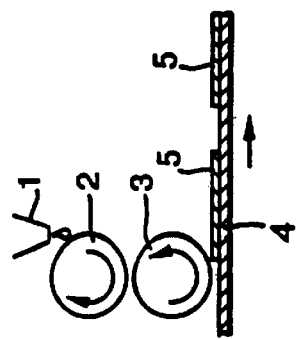
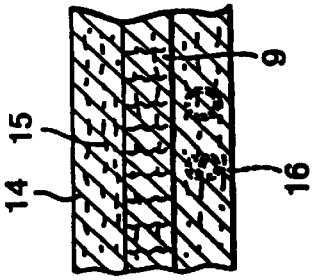 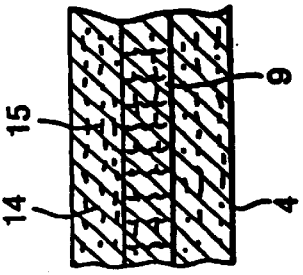 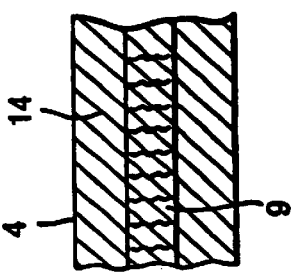 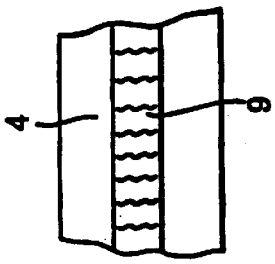 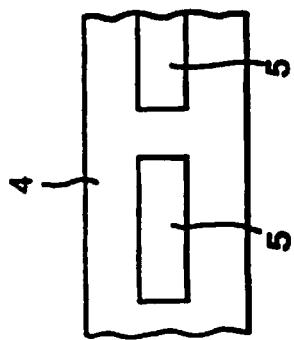

SECURITY DEVICE MANUFACTURE

The invention relates to a method of manufacturing a security device, in particular incorporating an optically variable effect structure.

Optically variable effect structures such as holograms and diffraction gratings have been used widely over the last few years to impart security to documents of value such as banknotes, credit cards and the like. Conventionally, the structure is provided on a transfer foil and is then hot stamped from the transfer foil onto the final substrate. An early example of this approach is described in U.S. Pat. No. 4,728,377.

Hot stamp transfer techniques have worked well but involve a number of stages which it would be desirable to reduce. More recently, therefore, techniques such as in-situ polymerisation replication (ISPR) have been developed in which a polymer is cast or moulded against a holographic or other optically variable effect profile continuously while the polymer is held on a substrate, the profile then being retained by curing on or after removal from the profiled mould. Examples of this approach are described in U.S. Pat. Nos. 3,689,346, 4,758,296, 4,840,757, 4,933,120, 5,003,915, 5,085,514 and DE-A-4,132,476. In many of these examples, the optically variable effect structure is formed on a carrier for subsequent transfer although in some cases the structure is formed directly on the end product substrate.

Although these processes have been in existence for some time, little attention has been paid to the nature of the substrate on which the structure is provided.

In accordance with the present invention, a method of manufacturing a security device comprises providing a radiation curable material on a shrinkable substrate; imparting an optically variable effect structure on or into the radiation curable material; and curing the material so that it retains the optically variable effect structure.

We have realised that the known techniques of providing an optically variable effect structure directly on an end product substrate, for example ISPR, are much more flexible than has previously been realised and it is possible to use such a technique to place directly an optically variable effect structure onto a heat or chemically shrinkable substrate such as a shrink sleeve material. This leads to a number of advantages.

The process can be operated at high speed, for example up to 50 meters/minute or more while providing high fidelity, stable structures in the final product.

Some advantages of the invention, particularly with polypropylene substrates, are that it gives good impressions and release, is readily generated and replaced, gives good run lengths and also importantly does not absorb UV wavelengths as does PET if irradiating through it. This gives good use of the light input without being heated up or degrading.

A primary advantage of the present invention is that it enables a continuous in-line process to be utilised for its production in contrast to conventional hot stamping and other transfer processes.

Most conventional heat shrinkable materials can be used for the substrate, typically polymer films which have been bi-axially oriented. Some examples are given later.

Their surfaces will vary and different curing formulations will be needed as appropriate together with different surface treatments or primers as will be described below.

Important properties of the substrate material include:
  Wetting ability to accept and retain optically variable effect structure after all curing and other processes have been completed.
  Adhesion retention and ability to accept shrinkage stress and temperatures on heat shrink activation.
  Must not attack, craze or prematurely degrade through the use of solvents, plasticisers, process conditions and the like.

The radiation curable material will typically be a resin which may typically be of two types:
  a) Free radical cure resins which are unsaturated resins or monomers, prepolymers, oligomers etc. containing vinyl or acrylate unsaturation for example and which cross-link through use of a photo initiator activated by the radiation source employed e.g. UV.
  b) Cationic Cure resins in which ring opening (eg epoxy types) is effected using photo initiators or catalysts which generate ionic entities under the radiation source employed e.g. UV. The ring opening is followed by intermolecular cross-linking.

An important aspect of these resins is that they can be cured at modest (less than 50° C.) or even ambient temperature while operating at realistic production speed and therefore reduce the risk of damage to the structure by avoiding local overheating attack or stress. They can also be used as thin layers and provide efficient conversion of radiation energy to heat.

The radiation used to effect curing will typically be UV radiation but could comprise electron beam, visible, infrared or higher wavelength radiation, depending upon the material, its absorbance and the process used.

The substrate material will typically be transparent so that the optically variable effect structure can be provided on a surface of the substrate which will not be externally exposed in use, while permitting the optically variable effect to be viewed through the substrate.

The structure may contain a hologram or diffraction grating and is preferably applied in the direction of least shrinkage of the substrate. This assists in preserving the form of the structure and optical replay after heat shrinking has been carried out. (The hologram or diffraction grating will preferably be viewable under white light illumination but could also be viewable under non-white light e.g. UV or IR.) The direction of least film shrinkage will be dependent on the manner in which the film or substrate has been manufactured. Shrinkage films are made by stretching the base material and orienting the molecules. The resultant products may then shrink on thermal or chemical exposure by 55–70% across the film and 5–7% in the linear direction. Depending on the article and the shrink required we would normally apply the images so that the replay would be in the linear direction i.e. least shrink effects.

Typically, the structure will be compressed on heat shrinkage by about 5% and thus must be resilient so that it will retain its integrity. Stress from heat and shrinkage must not destroy or significantly reduce the image replay or cause loss of adhesion, mechanical stress, cracking, etc.

With some substrates such as PVC, retention of the integrity of the structure will occur without further action being required. In other cases, however, such as on PET substrates, a pre-treatment may be required to achieve bonding, colouring or other effects or mechanical stress relief layers. This priming or pre-treatment may involve corona treatment with or without a thin layer coating before ISPR or a suitable thin layer directly applied to the substrate material. Corona discharge treatment will clean the surface and improve its wetting and bonding capacity to a primer layer or to the ISPR (or radiation curable) layer often without the use of a separate thin primer layer.

Before or after the provision of the cured optically variable effect structure, the substrate may be provided with other indicia by, for example, being printed, particularly on its surface opposite to that on which the radiation curable material is provided. The indicia may comprise a decorative finish, manufacturer's details and the like. In addition, the printing may define windows through which the optically variable effect can be viewed.

The substrate itself may be transparent or tinted and the method may further comprise providing a high reflective layer, such as a metallisation or a high refractive index material, over the profile. This promotes the replay of the optically variable effect but will not always be necessary particularly if subtle effects are required.

If a metallisation is provided, this may be partially demetalised to achieve a patterning effect while a further protective lacquer could be applied over the optically variable effect generating structure either before or after curing.

In a further option, an adhesive layer could be is provided over the optically variable effect generating structure which enables the structure to be adhered to an article in a similar manner to that which is described in more detail in WO-A-96/27178. This is particularly useful where the finished product is to be used in the form of a shrink sleeve or the like.

For products where high security is not critical, the optically variable effect generating structure may be provided on the surface of the substrate which will be external in the finished product. In this case, the substrate could be opaque or have low transparency.

BRIEF DESCRIPTION OF THE DRAWINGS

An example of a method according to the invention will now be described with reference to the accompanying drawings, in which:

FIGS. 1A, 1B, 1C, 1D and 1E illustrate successive stages in the process in the form of schematic side elevations; and, FIGS. 2A, 2B, 2C, 2D and 2E illustrate the appearance of the film in plan form at each of the stages corresponding to FIGS. 1A–1E respectively.

In the first stage (FIGS. 1A and 2A), a resin is supplied from a nozzle 1 onto a transfer roller system 2, 3 which transfers the resin onto a moving heat shrinkable film 4 to form successive deposits 5 spaced apart along the film. (A continuous deposit could be provided instead) The film can be any suitable polymer material, for example poly(vinyl chloride), poly(propylene), poly(ethylene), poly(ethylene terephthalate) or other polyester, poly(acrylates), poly (vinyldene chloride) or poly(styrene). Copolymers of the foregoing may also be used. It is preferred that the polymeric material be a transparent poly(propylene), PVC, or polyester film.

Mono-axially orientated films have typical shrink characteristics of 55–70% in the transverse direction and 5–7% in the machine direction. There are a wide range of suitable material thicknesses, e.g. 38 microns to 100 microns, reversion temperatures and other characteristics possible.

The resin may be any suitable cold curable radiation resin such as Free Radical and Cationic Cure resins. These are described above. In this particular example in which the film 4 comprises clear PVC, a free radical cure resin 5 is used, the formulation of which is set out below.

TABLE 1

| | Parts by weight |
|---|---|
| Ebecryl 1259 (UCB) Urethane acrylate oligomer (35% HPMA) | 70 |
| Trimethylol propane triacrylate | 20 |
| 2-Hydroxyethyl methacrylate | 5 |
| Benzophenone } initiator system | 3 |
| Triethanolamine | 2 |
| | 100.00 |

The coated film 4 then passes continuously to an embossing station shown in FIG. 1B in which the film 4 wraps around an embossing drum 6 (or an embossing belt) against which it is urged by a drum 7. The drum 6 carries a microstructure 8 on its surface which defines a hologram or diffraction grating, this structure being embossed into the resin 5 as shown at 9 (FIGS. 1B and 2B).

At the same time and/or following embossing, the embossed surface of the resin 5 is exposed to UV radiation. Various points for supplying UV radiation are shown at 10–13 in FIG. 1B. Downstream curing is shown at 10 while curing during the embossing process is shown at 11–13. As can be seen, if the drum 6 is transparent then UV curing can be carried out through the drum surface as shown at 11 while if the film 4 is transparent then UV curing can be carried out from the other side of the film as shown at 12, 13. In the case of UV curing at 13, the drum 7 must also be transparent.

When the resin described above in Table 1 is coated onto the PVC shrink sleeve film 4 at a thickness of between 2 and 5 microns and irradiated through a 50 micron embossed coated polypropylene sleeve (not shown) on the drum 6 in full wetted contact, the resin was cured at 40–50 meters/minute using 3×300 watt/meter irradiation medium pressure mercury lamps.

The cured and coated film 4 then passes to a metallisation station FIG. 1C where the embossed surface is vacuum metallised with a layer of aluminium 14 (FIG. 2C). This may be applied over the whole film or restricted by masking to the embossed ISPR area.

The surface relief structure which generates the optically variable effect could be a Kinegraphic effect or an holographic effect generating structure which is intended to include also all types of white light diffracting surface relief patterns formed in a polymeric medium in which the patterned surface is reflectively or refractively coated with an image enhancing composition such as a thin layer of aluminium or one or a number of stacked layers of zinc sulphide. Such coatings and equivalents are well known in the art and examples may be found in EP 201323A. The aluminium or other films could be provided in a continuous form or fine halftone dot formation as described in EP 328086A.

The visual appearance resulting from such diffracting structures may thus be of a regular diffraction grating, a mosaic of diffracting gratings, a three dimensional holographic spatial effect image or the like. Such diffracting structures can be generated by holographic recording or electron beam generation. For example, the optically variable effect generating structure may generate an holographic effect at least in one visually identifiable area, the structure being formed by a fine surface profile formed in a transparent plastic film, the profile being reflectively coated.

The metallised film then passes to an adhesive applying station shown in FIG. 1D in which a heat sealable or reactivatable adhesive coating 15 is applied on the metallisation 14 (FIG. 2D). This can be used to adhere the shrink material to an article as described in more detail in WO-A-96/27178.

Finally, the film is passed to a printing station (FIG. 1E) where information 16 (FIG. 2E) can be printed onto the surface of the film 4 remote from the resin 9. In addition, the printing could generate windows through which the holographic or plain metallic window effect can be viewed. These windows may have geometric or other shapes.

In addition, or alternatively, the film 4 could be preprinted prior to being supplied to the initial resin coating station shown in FIG. 1A.

In some cases, particularly for substrate material such as polypropylene and polyethylene, the resin may not adhere sufficiently strongly. To improve this, a primer could be applied to the substrate prior to coating the resin. Also, a corona treatment at for example 38–44 dynes/cm could be used to increase surface bonding.

Table 2 below describes a formulation for a primer suitable for PVC, poly(ethylene) and poly(propylene).

TABLE 2

|  | Parts by weight |
|---|---|
| UVP-210 (UCB) - polyesteracrylate | 88 |
| UVS-500 (UCB) - silicone acrylate oligomer | 8.5 |
| IRGACURE 184 (Ciba-Geigy) - photoinitiator | 3.5 |
|  | 100.00 |

In this case, the primer was used with a resin having a thickness of about 2 microns and which was cured at 40 meters/minute with 3×300 W/m irradiation at medium pressure Hg using the process described previously. Other top coat formulations can then be applied if desired.

Table 3 below illustrates a resin suitable for coating on polyester (PET) film where adhesion and stress relief properties are required.

| Coating For Polyester Film | |
|---|---|
|  | Parts by weight |
| Acrylated urethane | 66 |
| Tripropylene glycol diacrylate | 20 |
| Trimethylol propane triacrylate | 2.5 |
| Hydroxy ethyl methacrylate | 6.0 |
| Photoinitiator/free radical | 5.5 |
|  | 100.00 |

This coating would be applied at 2 to 5 microns thickness and cured as with the other coatings described above.

Following completion of the film, it can be formed into a shrink sleeve which will then be placed around an article to be protected, the sleeve then being shrunk onto the article in a conventional manner, usually by heat. If an adhesive is provided then the sleeve will additionally adhere to the article. This provides a very secure tamper evident security item.

What is claimed is:

1. A method of manufacturing a security device, the method comprising providing a radiation curable material on a shrinkable substrate; imparting an optically variable effect structure on or into the radiation curable material; and curing the material so that it retains the optically variable effect structure.

2. A method according to claim 1, wherein the shrinkable substrate is a heat shrinkable substrate.

3. A method according to claim 2, wherein the substrate comprises a bi-axially oriented polymer film.

4. A method according to claim 1, wherein the radiation curable material comprises a free radical cure resin or a cationic cure resin.

5. A method according to claim 1, wherein the radiation curable material is cured under UV radiation.

6. A method according to claim 1, wherein the shrinkable substrate is transparent.

7. A method according to claim 1, wherein the optically variable effect structure generates a hologram or diffraction grating.

8. A method according to claim 1, wherein the optically variable effect structure is applied in the direction of least shrinkage of the substrate.

9. A method according to claim 1, further comprising applying a primer to the substrate prior to application of the radiation curable material to enhance adhesion of the radiation curable material to the substrate.

10. A method according to claim 1, further comprising printing indicia on the substrate.

11. A method according to claim 10, wherein the indicia define one or more windows through which the optically variable effect can be viewed.

12. A method according to claim 1, further comprising providing a reflective layer on the optically variable effect structure.

13. A security device which has been manufactured by a method according to claim 1.

14. A device according to claim 13 in the form of a shrink sleeve.

* * * * *